United States Patent Office 3,133,113
Patented May 12, 1964

3,133,113
METHOD FOR PREPARING POLYCARBONATE ESTERS
John D. Malkemus, Austin, Tex., assignor to Jefferson Chemical Company, Inc., Houston, Tex., a corporation of Delaware
No Drawing. Filed Sept. 27, 1960, Ser. No. 58,654
7 Claims. (Cl. 260—463)

This invention relates to polycarbonate esters and, in particular, to an improved method for preparing polycarbonate esters from the reaction of glycols and polyglycols with carbonate esters.

The basic reaction for preparing polycarbonate esters, namely the reaction of a glycol with a carbonate ester, is a known reaction and may be illustrated by the following formula of the reaction of diethylene glycol with ethylene carbonate:

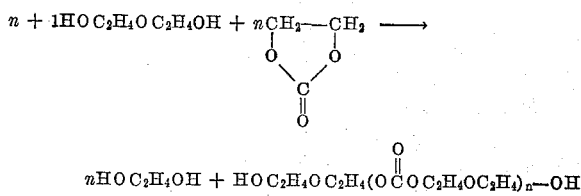

$n HOC_2H_4OH + HOC_2H_4OC_2H_4(O\overset{O}{\overset{\|}{C}}OC_2H_4OC_2H_4)_n\text{---}OH$ While effective, this reaction has a serious drawback as far as a commercial process is concerned since the reaction is slow and requires extremely long reaction periods. This drawback has been observed when the reaction was conducted in the absence of a catalyst and with prior known catalysts.

A method has now been discovered whereby the rate of reaction for producing polycarbonate esters is increased manyfold based on the use of a novel catalyst composition.

In accordance with this invention, a glycol and a carbonate ester are catalytically reacted to produce a polycarbonate ester. A critical feature of the process is the use of a mixed zinc borate-alkaline earth metal oxide catalyst which has been found unusually effective for increasing the rate of reaction between the glycol and the carbonate ester. As an example of the advantage realized, the rate of reaction between diethylene glycol and ethylene carbonate to form a polycarbonate ester was increased approximately fivefold as compared to the rate when this reaction was conducted in the absence of a catalyst. Zinc borate alone was relatively ineffective as a catalyst.

In its broadest aspects, this process is applicable to the reaction of alkylene and polyalkylene glycols with alkylene carbonates or dialkyl carbonates. The reaction in which the carbonate ester is ethylene carbonate may be generally represented by the following formula:

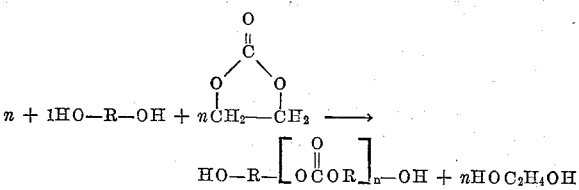

in which R is (1) a divalent aliphatic hydrocarbon radical having 2 to 8 carbon atoms or (2) a divalent oxyalkylene radical of the formula $(R'\text{---}O\text{---}R')_y$ where $y$ equals 1 to 6 and $R'$ is a divalent aliphatic hydrocarbon radical having 2 to 6 carbon atoms, and $n$ is a number from 1 to 50.

The glycols which may be employed in this process are represented by the formula HO—R—OH which is defined hereinabove. Both alkylene glycols and polyalkylene glycols are suitable. The preferred glycols for the reaction are diethylene glycol, triethylene glycol, tetraethylene glycol, dipropylene glycol, polypropylene glycols, 1,4-butanediol, 1,5-pentanediol and similar materials.

Both alkylene carbonates and dialkyl carbonates are equally effective in this process. The preferred carbonates are ethylene carbonate, propylene carbonate, diethyl carbonate, dimethyl carbonate and similar lower alkylene carbonates and dialkyl carbonates. Alkylene carbonates may be represented by the formula:

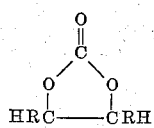

in which each R represents hydrogen or an alkyl radical having 1 to 3 carbon atoms and dialkyl carbonates are represented by the formula:

in which each R represents an alkyl radical having 1 to 3 carbon atoms.

While the proportions of the glycol and carbonate ester reactants employed in this reaction may be varied over a broad range, it is advantageous to employ an excess of the carbonate ester. Generally, a carbonate ester to glycol mol ratio in the range of 1.2:1 to 2.5:1 is satisfactory although it is preferred to employ ratios in the range of 1.5:1 to 2:1.

An essential feature of this process is the zinc borate-alkaline earth metal oxide catalyst which has been found unusually effective for promoting this reaction. Preferred alkaline earth metal oxides are barium and calcium oxides. This catalyst composition may be varied considerably with respect to the proportions of the zinc borate and the alkaline earth metal oxide. Thus, the proportion of the zinc borate component may be varied from 25% to about 75% while the amount of the alkaline earth metal oxide is varied from 75% to 25%. Equal weight amounts of the catalyst components are preferred with barium oxide being the preferred alkaline earth metal oxide. The catalyst is prepared by mixing the two components.

A relatively small amount of catalyst is sufficient to realize the desired improvement by this process. Generally, an amount of catalyst in the range of 0.001% to 1.0% by weight based on the glycol reactant will be adequate with the preferred amount being from 0.001% to 0.1%. Larger amounts of catalyst may also be employed but these generally do not provide sufficient added advantages.

This reaction is conducted at moderately elevated temperatures up to about 135° C. with temperatures from 90 to 130° C. being preferred. Temperatures below 135° C. are advantageous to reduce the weight loss below 1% and to reduce side reactions.

It is generally desirable to conduct the reaction under reduced pressures usually below about 50 mm. of mercury absolute and preferable below 20 mm. of mercury absolute to effect the removal of the by-product glycol or alcohol by distillation and thereby force the reaction to completion.

The products of this process are generically called polycarbonate esters with the products formed in a reaction with polyalkylene glycols being more specifically designated polyether-polycarbonate esters. In general, they are viscous light-colored liquids which are insoluble in water, acetone and benzene but are soluble in ethylene dichloride and propylene carbonate. The molecular weights of these materials may range from about 500 to about 4000.

In a typical operation, the reactants are combined in a suitable vessel followed by addition of the catalyst.

The mixture is heated to about 130° C., while the pressure in the reaction vessel is reduced to about 10 mm. of mercury absolute. The reaction proceeds while the mixture is refluxing. By-product glycol or alcohol formed by the reaction is continually removed overhead until the reaction is substantially complete. The reaction product is finally stripped at 1 mm. of pressure at gradually increasing temperatures until the kettle temperature reaches 175° C. to 200° C.

The following examples illustrate the practice of this invention.

*Example I*

704 grams (8.0 mols) of ethylene carbonate and 424 grams (4.0 mols) of diethylene glycol were reacted in the presence of 0.2 gram of catalyst containing equal amounts of zinc borate and barium oxide at a temperature of 125–130° C. and a pressure of 10 mm. of mercury absolute in a vessel fitted with a distillation column. The reaction conditions were maintained for 9 hours after which stripping was effected at 1 mm. of mercury pressure and gradually increasing temperature to 200° C. 407 grams of a viscous, white product were obtained which was equivalent to a yield of 77%. The product had a hydroxyl number of 50 and a molecular weight of 2240.

*Example II*

This example was conducted using the same reactants and following the same procedure employed in Example I above except that the proportions were increased five-fold. 1974 grams of a viscous white diethylene glycol polycarbonate ester was obtained equivalent to a yield of 75% based on the diethylene glycol charged. The hydroxyl number was 48 and the molecular weight calculated as 2340.

*Example III*

525 grams (3.5 mols) triethylene glycol and 616 grams (7.0 mols) ethylene carbonate were reacted in the presence of the same catalyst and following the same procedure employed in Example I above. 496 grams of a slightly hazy, light-yellow product was obtained equivalent to an 80% yield. The hydroxyl number was determined as 59 and the molecular weight of the triethylene glycol polycarbonate ester calculated as 1900.

*Example IV*

704 grams (8.0 mols) ethylene carbonate and 420 grams (3.96 mols) of diethylene glycol were introduced into a reaction vessel in the absence of a catalyst. This mixture was heated at 125–130° C. under a pressure of 10 mm. for 46 hours until all of the ethylene glycol by-product formed in the reaction was removed overhead. The reaction product was finally stripped at 1 mm. pressure at gradually increasing temperatures to a final temperature of 175° C. to remove the excess ethylene carbonate and unreacted diethylene glycol. 426 grams of a viscous, white liquid product was obtained. This product had a hydroxyl number of 60 and a calculated molecular weight of 1870.

It will be seen that while this non-catalytic process is effective, it required 46 hours as compared to 9 hours or substantially over five times the reaction time required for the equivalent reaction with the zinc borate-alkaline earth metal oxide catalyst as shown in Example I.

*Example V*

360 grams (4.0 mols) of 1,4-butanediol and 704 grams (8.0 mols) of ethylene carbonate were reacted in the presence of 0.2 gram of catalyst consisting of equal amounts of zinc borate and barium oxide at temperatures in the range of 119–126° C. The reaction conditions were maintained for 6 hours after which the product was stripped at temperatures up to 200° C. under 3 mm. of mercury pressure. 388 grams of product were obtained representing an 83% yield. The hydroxyl No. was 48 corresponding to a molecular weight of 2340.

I claim:

1. A method for preparing a polycarbonate ester which comprises reacting a glycol with a carbonate ester at a temperature from 90° to about 135° C. and in the presence of from about 0.001% to about 1.0% by weight, based on said glycol, of a catalyst composition comprising from about 25% to about 75% of zinc borate and correspondingly from about 75% to about 25% of an alkaline earth metal oxide, said glycol having the formula:

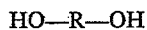

in which R is selected from the group consisting of divalent alkylene hydrocarbon radicals having from 2 to 8 carbon atoms and divalent oxyalkylene radicals of the formula:

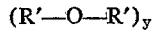

where y equals 1 to 6 and R' is a divalent alkylene radical having from 2 to 6 carbon atoms, said carbonate ester being selected from the group consisting of alkylene carbonates having the fomula:

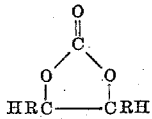

and dialkyl carbonates having the formula:

wherein R represents an alkyl group having 1 to 3 carbon atoms.

2. A process according to claim 1 in which equal weight amounts of zinc borate and barium oxide are employed in said catalyst.

3. A process according to claim 1 in which the mol ratio of said carbonate ester to said glycol is in the range of 1.2:1 to 2.5:1.

4. A process according to claim 1 in which said glycol is diethylene glycol.

5. A process according to claim 1 in which said glycol is triethylene glycol.

6. A process according to claim 1 in which said glycol is 1,4-butanediol.

7. A process according to claim 1 in which said carbonate ester is ethylene carbonate.

References Cited in the file of this patent

UNITED STATES PATENTS 2,787,632    Stevens                 Apr. 2, 1957
2,789,968    Reynolds et al.        Apr. 23, 1957